United States Patent [19]
Ojala

[11] Patent Number: 5,551,246
[45] Date of Patent: Sep. 3, 1996

[54] CENTRIFUGAL LIQUID SEPARATOR AND DEFOAMER

[75] Inventor: Russell Ojala, Bridgewater, N.J.

[73] Assignee: Croll-Reynolds Company, Inc., N.J.

[21] Appl. No.: 418,084

[22] Filed: Apr. 6, 1995

[51] Int. Cl.$^6$ .................................................. F25B 19/00
[52] U.S. Cl. ................................................ 62/100; 62/268
[58] Field of Search ............................ 62/100, 268, 270, 62/169

[56] References Cited

U.S. PATENT DOCUMENTS

| | | | |
|---|---|---|---|
| 2,406,682 | 8/1946 | Hayes et al. | 62/268 |
| 3,403,528 | 10/1968 | Chelminski | 62/100 |
| 4,519,116 | 5/1985 | Aberle et al. | 28/257 |
| 4,838,035 | 6/1989 | Carlson et al. | 62/55.5 |
| 5,359,861 | 11/1994 | Maier-Laxhuber et al. | 62/100 |

FOREIGN PATENT DOCUMENTS 160766  2/1921  United Kingdom ..................... 62/268

Primary Examiner—William Doerrler
Attorney, Agent, or Firm—Bierman & Muserlian

[57] ABSTRACT

A centrifugal liquid separator and defoamer for use in a vacuum cooling system including a cooling vessel having a vessel interior for containing a liquid to be cooled, and a vacuum system for applying a vacuum to an interior of the vessel, through a vessel vapor outlet nozzle. This separator and defoamer includes at least one impeller blade positioned in the vicinity of a juncture of the vessel interior and vessel vapor outlet nozzle, this impeller blade being rotated at a speed at which any liquid contacting the rotating impeller blade will be thrown off the blade, and any foam contacting the impeller blade will be converted to liquid and thrown off the blade, in the direction of the vessel interior, by centrifugal action.

8 Claims, 4 Drawing Sheets

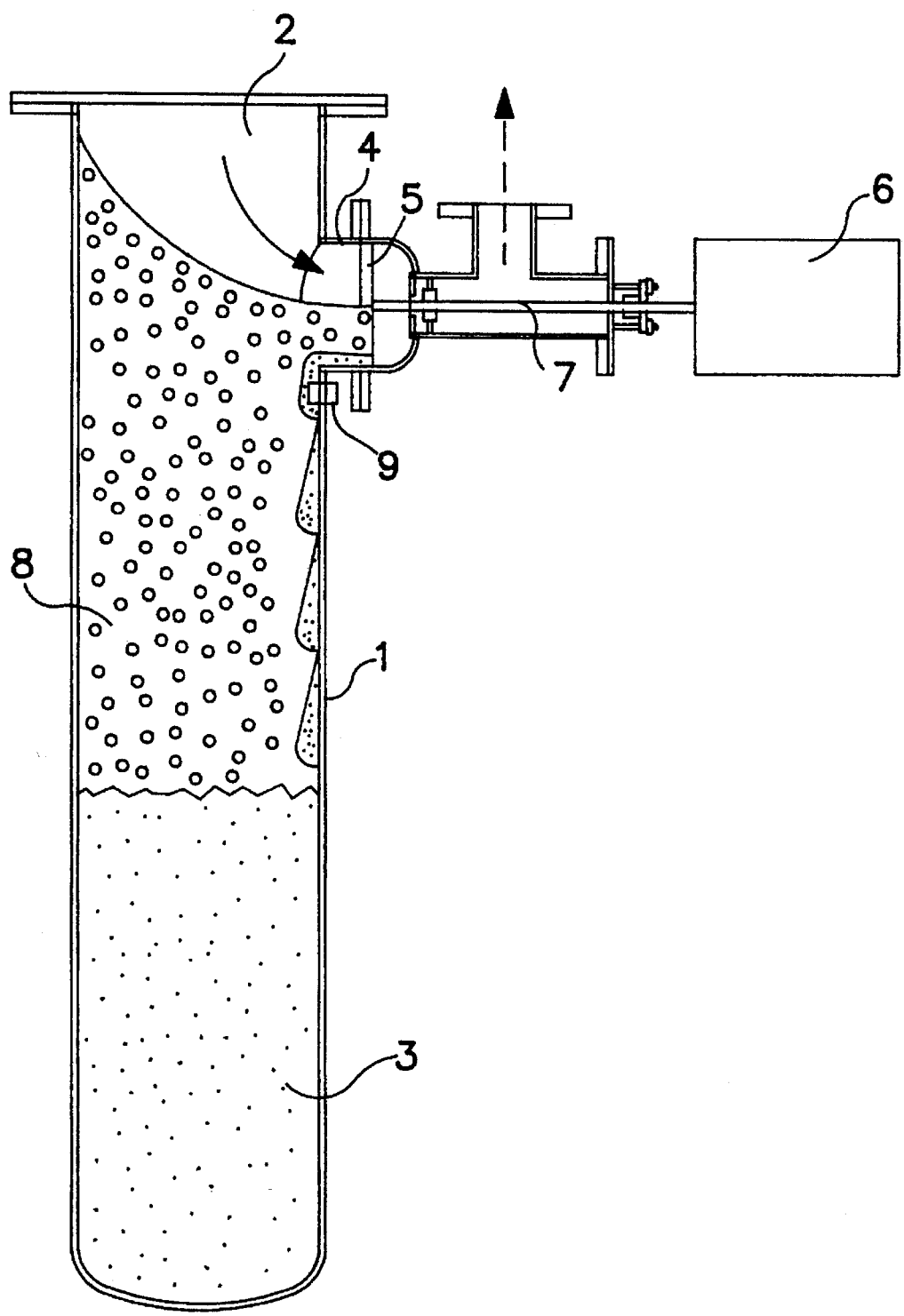
FIG. IC

CENTRIFUGAL LIQUID SEPARATOR AND DEFOAMER

The present invention is directed to a centrifugal liquid separator and defoamer, and more specifically, to a device for preventing the fouling of vacuum lines of a vacuum cooling system including a cooling vessel having an interior for containing a liquid to be cooled, and a vacuum system for applying a vacuum to the vessel interior through a vessel vapor outlet nozzle, to cool the vessel contents.

BACKGROUND OF THE INVENTION

To rapidly cool products, the food industry has increasingly turned to vacuum cooling processes. These vacuum systems can be used to cool various food products in a fraction of the time necessary with conventional methods. Such systems are particularly useful for cooling milk. In such a system, a vessel filled with milk is quickly cooled when exposed to an increasing level of vacuum. However, in such a process, when the level of vacuum reaches approximately 10 mm of mercury, a milk foam begins to form on the top of the liquid. As the vacuum level increases, the foaming action accelerates to the point at which the upper part of the vessel becomes completely filled with foam. The foam is then drawn into the piping leading to the vacuum equipment, thereby fouling the vacuum lines. This piping must then be disassembled and cleaned, a very time-consuming process.

To prevent this foaming, it has been suggested that food companies control the level of vacuum. To achieve such control, an operator must watch the milk cooling process and, when foaming is detected, prevent the level of vacuum from increasing further. This has been done by opening a valve, which caused bleeding of atmospheric air into the vacuum system. The disadvantage of this method is that the cooling process is lengthened, and an operator must observe the entire process. Therefore, methods of automating this process have been desired.

One solution to the foregoing problem would be to install a control valve to bleed in a set rate of air at a specific time relative to the product being cooled. Alternatively, a level detector, sensitive enough to detect foaming, could be installed to signal the control valve to bleed in air when foaming occurs. The disadvantage to any such control valve set up, however, is that the initial expense is greater and, a slower cooling cycle occurs due to the air which is bled into the system.

BRIEF DESCRIPTION OF THE INVENTION

In view of the foregoing, it is an object of the present invention to provide a device which prevents foam from entering the vacuum system, without adversely affecting the speed of the cooling process. More specifically, the invention is directed to a device that allows the product to foam, but prevents the foam from entering the vacuum system piping.

Other objects and features of the present invention will become apparent from the following detailed description considered in conjunction with the accompanying drawings.

BRIEF DESCRIPTION OF THE DRAWINGS

FIGS. 1A, 1B, and 1C show a side view of a vacuum cooling system, with the inventive device installed, at an initial time, at a time at which foaming has begun, and at a time at which the foam level has reached the height of the vapor outlet nozzle, respectively;

DETAILED DESCRIPTION OF THE INVENTION

Figure 1A:
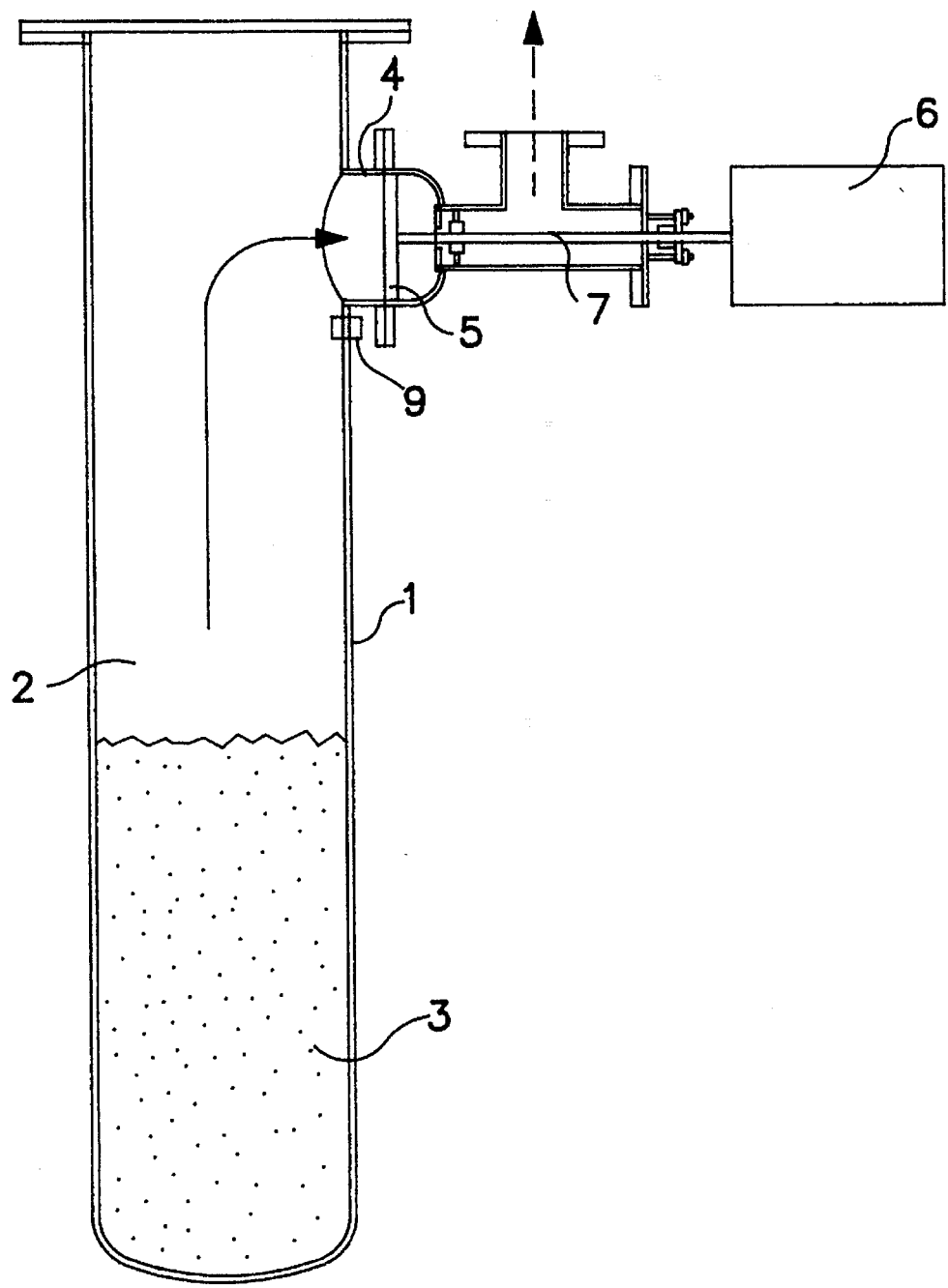
Figure 1B:
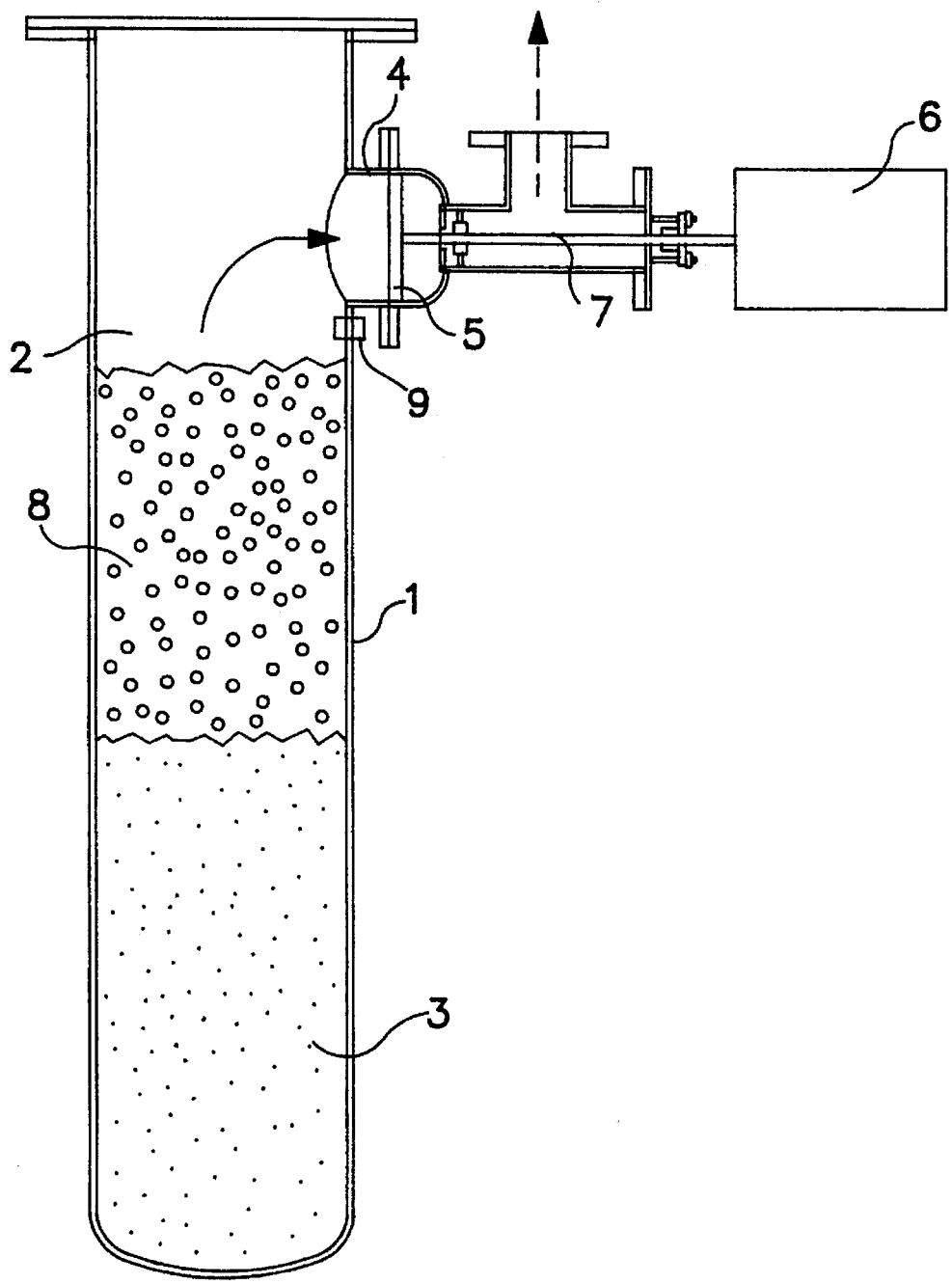

Referring to FIG. 1a, there is shown a vacuum cooling system including the inventive centrifugal liquid separator and defoamer. The vacuum cooling system includes cooling vessel 1 having a vessel interior 2 for containing liquid 3 to be cooled. A vacuum system (not shown) applies a vacuum to vessel interior 2 through vessel vapor outlet nozzle 4. In the vicinity of a juncture of vessel 1 and vessel vapor outlet nozzle 4, there is provided at least one impeller blade 5 drivable by a driver mechanism such as motor 6, via drive shaft 7. As shown in FIG. 1b, upon cooling, product 3 can begin to foam; as shown in FIG. 1c, foam 8 will eventually reach the level of vessel vapor outlet nozzle 4. However, by rotating impeller blade 5, at a suitable speed, any liquid contacting rotating impeller 5 will be thrown off blade 5, and any foam contacting rotating impeller blade 5 will be converted to liquid and thrown off blade 5, in the direction of vessel interior 2, by centrifugal action.

Figure 2:
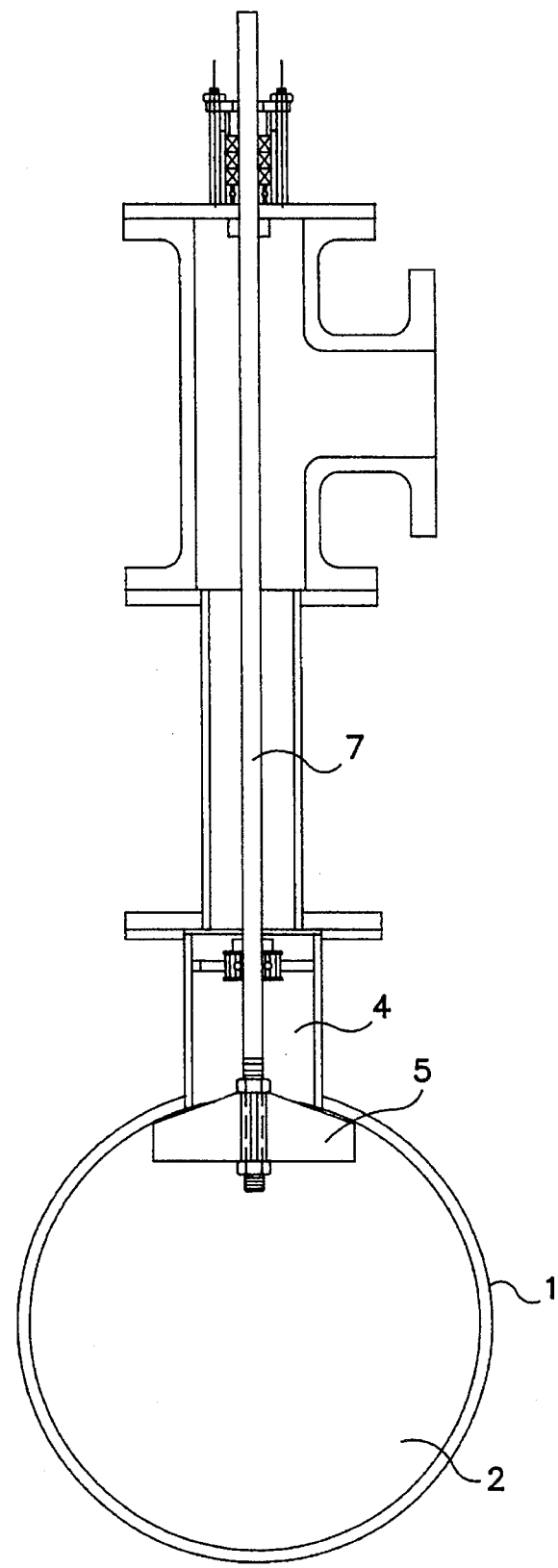
FIG. 2 is a section view, from above, illustrating the position of the inventive device within the vapor outlet nozzle.

Blade 5 can be rotated during the entire cooling process, or, alternatively, foam sensing device 9 can be provided to turn motor 6 on and off as needed. Blades 5 should be positioned parallel to shaft 7 such that there is a minimum amount of flow resistance when not rotating. Blades 5 can be positioned in front of vapor outlet nozzle 4, as shown in FIG. 2, or, preferably, can be positioned, as shown in FIGS. 1A–1C, inside vessel vapor outlet nozzle 4.

The specific function of the device is to prevent any type of food solid or foam from entering and fouling the process vacuum piping. While described above in the context of milk, which can foam during cooling, the invention is also useful with other food products such as tomato sauces, and other viscous types of foods. Such foods tend to display periodic eruptions during processing; as such eruptions can happen at any time during processing the device would be operated continually during the cooling cycle. The inventive device is easily cleaned by uncoupling the shaft from the motor, and pulling the blades into the vessel.

While only the fundamental novel features of the invention as applied to a preferred embodiment thereof have been shown and described, it is understood that various omissions, substitutions, and changes in the form and details of the device illustrated, and in its operation, may be made by those skilled in the art without departing from the spirit of the invention. It is therefore the intention of Applicant that the invention be limited only as indicated by the scope of the claims appended hereto.

I claim:

1. A centrifugal liquid separator and defoamer in a vacuum cooling system including a cooling vessel having a vessel interior for containing a liquid to be cooled, and a vacuum system for applying a vacuum to said vessel interior through a vessel vapor outlet nozzle, said centrifugal liquid separator and defoamer comprising at least one impeller blade positioned in the vicinity of a juncture of said vessel interior and said vessel vapor outlet nozzle, said impeller blade being rotatable at a speed at which any liquid contacting the rotating impeller blade will be thrown off said blade, and any foam contacting said rotating impeller blade will be converted to liquid and thrown off said blade, in a direction of said vessel interior, by centrifugal action.

2. The centrifugal liquid separator and defoamer of claim 1 wherein said impeller blade is positioned within said vessel interior.

3. The centrifugal liquid separator and defoamer of claim 1 wherein said impeller blade is positioned within said vessel vapor outlet nozzle.

4. The centrifugal liquid separator and defoamer of claim 1 further comprising a liquid sensor for sensing a level of a liquid or foam within said vessel interior, and beginning rotation of said impeller blade when said liquid or foam is sensed.

5. A method of preventing fouling of a vacuum line in a vacuum cooling system including a cooling vessel having a vessel interior for containing a liquid to be cooled, and a vacuum system for applying a vacuum to said vessel interior through a vessel vapor outlet nozzle, said method comprising;

positioning a centrifugal liquid separator and defoamer within said vacuum cooling system, said centrifugal liquid separator and defoamer comprising at least one impeller blade positioned in the vicinity of a juncture of said vessel and said vessel vapor outlet nozzle, and a driver for rotating said impeller blade; and rotating said impeller blade at a speed at which any liquid contacting the rotating impeller blade will be thrown off said blade and any foam contacting said rotating impeller blade will be converted to liquid and thrown off said blade, in a direction of said vessel interior, by centrifugal action.

6. The method of claim 5 wherein said blade is positioned within said vessel interior.

7. The method of claim 6 wherein said blade is positioned within said vessel vapor outlet nozzle.

8. The method of claim 5 wherein said centrifugal liquid separator and defoamer further comprises a sensor which senses foam and liquid in said vessel interior, and begins rotation of said impeller blade, when said foam and liquid is sensed.

* * * * *